June 15, 1965 H. H. GATES ETAL 3,188,745
TOOTH SPACE MEASURING MACHINE
Filed April 14, 1961 7 Sheets-Sheet 1

FIG.1.

INVENTORS
ARTHUR I. BEAN
HESSLAR H. GATES
BY
*John Moulton*
THEIR ATTORNEY

June 15, 1965  H. H. GATES ETAL  3,188,745
TOOTH SPACE MEASURING MACHINE
Filed April 14, 1961  7 Sheets-Sheet 2

INVENTORS
ARTHUR I. BEAN
HESSLAR H. GATES
BY
THEIR ATTORNEY

INVENTOR.
ARTHUR I. BEAN
HESSLAR H. GATES
BY

THEIR ATTORNEY

United States Patent Office 3,188,745
Patented June 15, 1965

3,188,745
TOOTH SPACE MEASURING MACHINE
Hesslar H. Gates, Charlestown, N.H., and Arthur I. Bean, Springfield, Vt., assignors to The Fellows Gear Shaper Company, Springfield, Vt., a corporation of Vermont
Filed Apr. 14, 1961, Ser. No. 103,107
5 Claims. (Cl. 33—179.5)

The present invention relates to gear measuring machines and more particularly to a device for testing gear teeth or gear tooth spacing in a fast and efficient manner by the use of mechanism which makes it possible to inspect all the teeth of a gear or all the gear tooth spacing rapidly in a manner not heretofore possible.

In inspecting gears it is common practice to mount a gear on a rotary spindle and clamp it in place by any well known means, then during intermittent increments of rotation to insert a stylus or pointer between the teeth.

In many cases a gear is inspected at random points about its periphery, but this spot check method can be ineffective in a production line where finding irregularities in cutting can result in the passing of many gears before an inaccuracy is detected. The present invention is concerned with a complete automatic rotation of a gear for inspection.

In the device of the present invention the gear is rotated 360° and during this rotation if desired a recording chart may be used and marked in a series of comparison marks concerning the angular relationship of the teeth, such as for example in a tooth to tooth inspection, or a tooth spacing inspection or a tooth thickness inspection.

Therefore it is the principal object of the present invention to provide a device for measuring gear teeth or the like during a continuous cycle including an intermittent indexing operation.

Another object of the present invention is to provide a device for measuring gear teeth or gear tooth spacing without the use of a master gear, or other comparative means.

Another object of the present invention is to provide a device for measuring gear teeth in which tooth deviation may be examined during a continuous cycle including an intermittent indexing of the gear.

Another object of the present invention is to provide a device for measuring gear teeth or the like in which the refinement of calibration can be adjusted to a high degree of accuracy.

In the drawings.

Like reference characters designate the same parts wherever they occur in the specification and the drawings.

The machine is driven by a motor M (FIGURE 8) which is adjustably mounted on a motor bracket M–1 located in the base of the machine. A conventional belt 1 drives pulley 2. Pulley 2 is mounted on a shaft containing a worm 3 which rotates in mesh with worm wheel 4 to crank shaft 5. A shaft 3a and hand wheel 3b (FIGURE 10) are provided for the purpose of hand adjusting the crank shaft during the setting up of the mechanism concerned herein. Worm wheel 4 is mounted on and keyed to crank shaft 5. Shaft 5 is mounted rotatably in base 6 in bearings 7 and 8.

A reduced portion of shaft 5 has a spindle extension member 9 threaded thereon. Spindle extension 9 rotates with worm wheel 4 and shaft 5 inside oil seal 11 which is mounted in gear housing cover plate 12. Numeral 13 designates a gasket between gear housing cover plate 12 and base 6 which prevents the loss of lubricating oil. Cover plate 12 is held secure to a base 6 by a series of bolts 14.

The composite arrangement of spacers 15 and bolts 16 hold valve supports 17 which carries four index and clamp valves, the function of which will be described later.

Washer 10a and bolt 10 hold valve actuator carrying member 18 secure to spindle extension member 9 in order for it to rotate therewith. Valve actuator carrying member 18 has valve actuators 19 and 20 mounted at each end and held thereto by respective bolts 21 and 22. These valve actuators 19 and 20 are rotated to actuate the limit valves 148, 149, 150 and 151 which in turn actuate the four way valves 145 and 146 (FIGURE 11) to release or stop the pneumatic pressure which effects the clamping and unclamping of the index disc 70 (FIGURE 5) during the intermittent stopping and starting of the gear being inspected, and also effect the actuation of the stylus or pointer which fits between the teeth being inspected.

The top of crank shaft 5 has formed thereon a rotary head member 23 which houses a threaded member 24 which threads through crank pin 25 for the obvious purpose of adjusting crank pin 25 to shorten or lengthen the stroke of connecting rod 26. Mounted rotatably on crank pin 25 is crank pin bearing 27 which rides on washer 28 inside a larger crank bearing 29. A bearing retainer 30 is secured to larger crank bearing 29 by a series of bolts 31. Washer 32 is held in place on crank pin 25 by a nut 33. Larger crank bearing 29 has connecting rod housing 34 mounted thereon and held by bolts 34a. Connecting rod housing 34 is a cylindrical member which houses the telescoping connecting rod 26 and washers 35 and 36 and snap rings 35a and 36a and spring 37. These parts are all retained in connecting rod housing 34 by bushing 38 and screw 39.

Spring 37 is normally under compression and held in place by washers 35 and 36 which abut against shoulders provided in connecting rod housing 34. When the motion of spherical bearing member 42 is arrested by hitting an anvil the spring 37 is further compressed by the continued motion of housing 34. The housing moves away from either washer 35 or 36 and the washer at the other end moves away from either snap ring 35a or 36a. As the rod 26 travels in either direction the washers 35 and 36 and the snap rings 35a and 36a function as described above to compress the spring 37 and thereby effect a constant contact pressure between the spherical bearing member 42 and the anvil or stop which it is in contact with.

The end of connecting rod 26 has a wrist pin 40 mounted thereon and held in place by fastening means 41. The bottom portion of wrist pin 40 has mounted thereon a spherical surfaced bearing member 42, the purpose of which will be described later.

Figures 8, 9, 10:
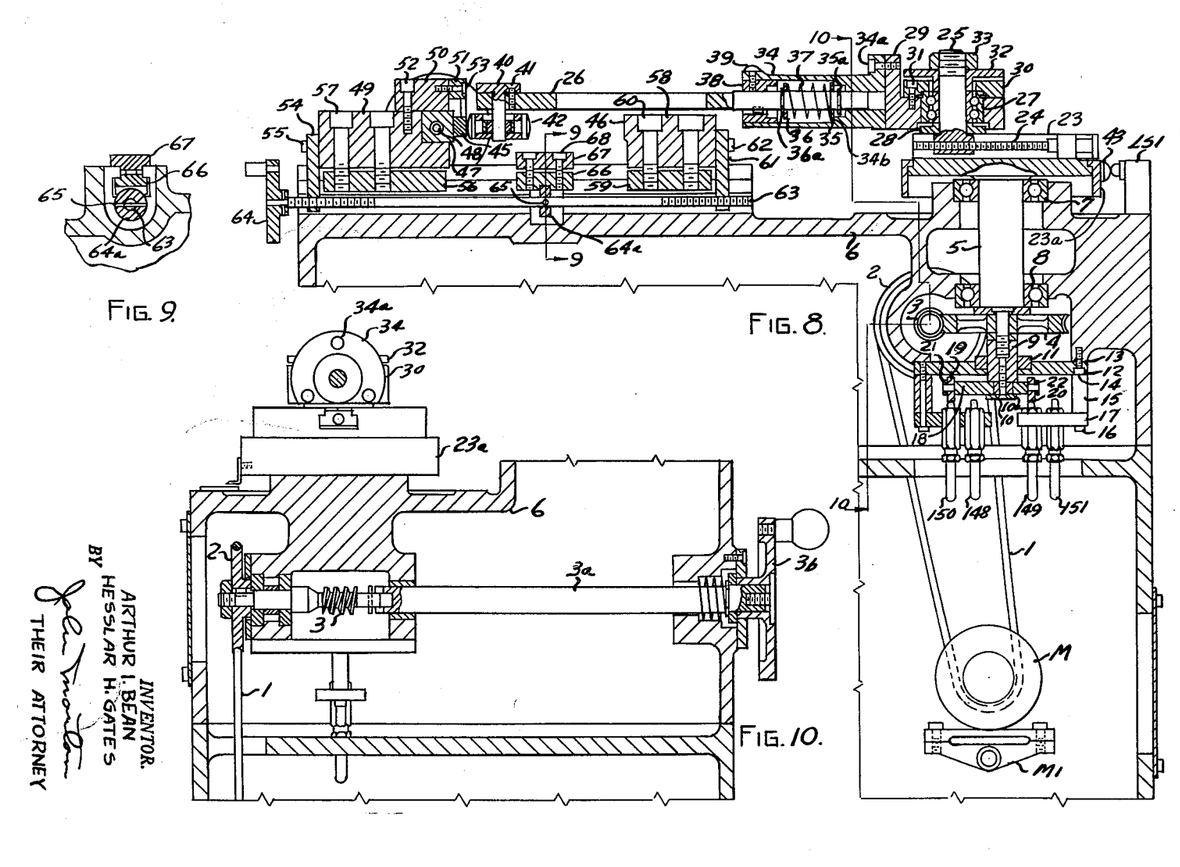
FIGURE 8 is a view taken along line 8—8 of FIGURE 4 and showing the crank and crank arm and the main drive motor and worm and worm wheel drive.
FIGURE 9 is a view taken along line 9—9 of FIGURE 8 showing the member which secures the adjusting screw in place and prevents any endwise movement thereof.
FIGURE 10 is a view taken along line 10—10 of FIGURE 8 and showing the motor pulley and worm and showing the hand adjustment when setting up the work.

As shown in FIGURE 8, a limit switch LS1 is suitably mounted in the base 6 and has an actuator button 43 threaded into the periphery of cam ring member 23a which is mounted on rotary head member 23 of crank shaft 5. Button 43 is so arranged that the rotation of rotary head member 23 will cause button 43 to actuate limit switch LS1, the purpose of which is to count the number of indexing movements during any one recording.

Anvil or stop 45 (FIGURE 8) is slidably held against block 47 by a clamping block 51. Block 47 has a taper on the back side which abuts against upper block 49.

Clamping block 51 is held to upper clamping block 50 by screws 53.

Figure 4:
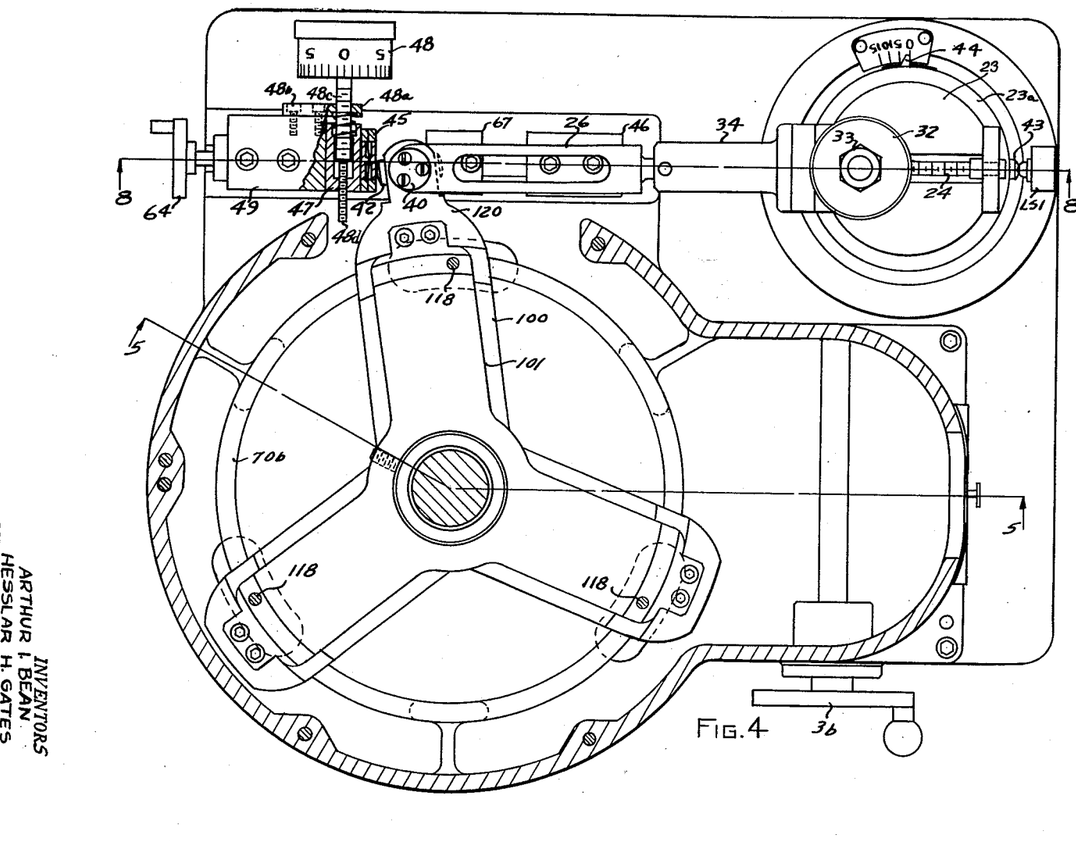
FIGURE 4 is a view taken along line 4—4 of FIGURE 1 showing the upper spider and index disc, crank and crank arm which effects the indexing.

Upper clamping block 50 holds slidably mounted block 47 in place on upper block 49 by means of screws 52. Differential screw 48 (FIGURE 4) is threaded through bracket member 48a which is held to upper block 49 by bolts 48b. Differential screw 48 is also threaded into block 47. The thread 48c on differential screw 48 that mates with the thread in bracket member 48a is of a different pitch than the thread 48d on the portion of differential screw 48 that mates with the thread in block 47. Therefore, it will be apparent that any rotation of screw 48 causes endwise movement of block 47 relative to anvil 45 and by reason of the taper on block 47 sliding against upper block 49 it will slightly adjust the distance between the anvils 45 and 46. It will thus be clear that this mechanism can be employed to secure minute adjustment of the anvil 45 with respect to the anvil 46. Since there is a taper on the back side of block 47, any movement of this block 47 lengthwise of itself will move anvil 45 toward or away from the anvil 46. The differential screw arrangement is employed in order to obtain a very minute movement of the block 47 relative to the upper block 49 since it is possible to rotate the coarse threaded portion 48c of the differential screw 48 a relatively large amount and yet obtain a very small movement of the block 47 through the coaction of the fine thread 48d with this block. In other words, a differential movement is obtained as is well known in the mechanical field by reason of the differential screw 48.

Upper block 49 has a member 54 fastened to one end by screws 55. Upper block 49 is also bolted to lower block 56 by bolts 57. Lower block 56 is held slidably in a way on base 6.

An anvil or stop 46 is formed by a protruding portion of upper T block 58. Upper T block 58 is held to lower T block 59 by bolts 60. Lower T block 59 is also held slidably in a way on base 6. Upper T block 58 has a member 61 fastened to one end by a screw 62.

Member 61 and member 54 have threaded openings on their lower ends which accommodate adjusting screw 63. Adjusting screw 63 has a hand crank 64 on one end thereof for the purpose of rotating to either advance or retract anvils 45 and 46 to properly position them for any specific amount of distance change.

Adjusting screw 63 has a washer 64a held on it by a pin 65. Washer 64a rotates with screw 63 in a recession provided in base 6 and in lower center block 66.

Upper center block 67 is held to lower center block 66 by bolts 68.

When adjusting screw 63 is rotated to adjust the distance between the anvils or stops, washer 64a riding in the slot provided in lower center block 66 prevents any endwise movement of adjusting screw 63, since lower center block 66 is locked to a T slot in base 6 by tightening bolts 68.

When it is desirable to make an adjustment to the anvils or stops 45 and 46, bolts 57 and 60 must first be loosened then hand crank 64 rotated.

Figure 1:
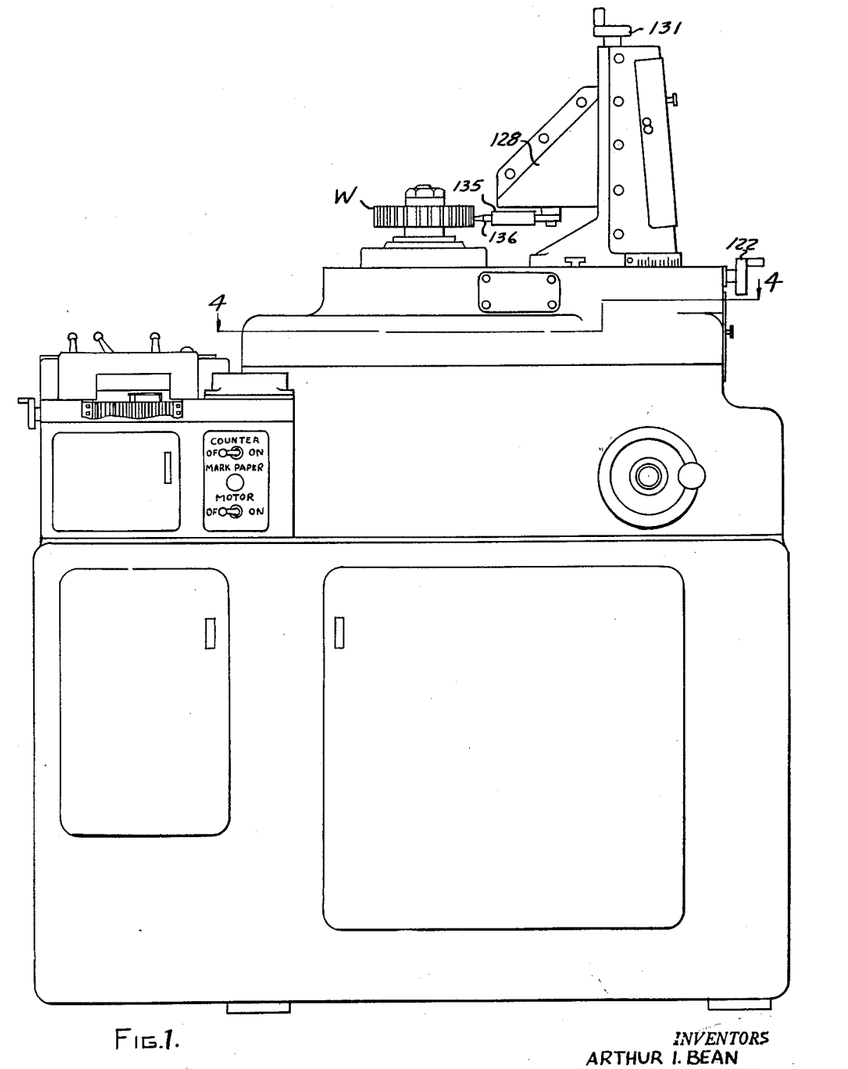
FIGURE 1 is a front view of the machine showing a measuring stylus in relation to a gear being checked.
Figure 2:
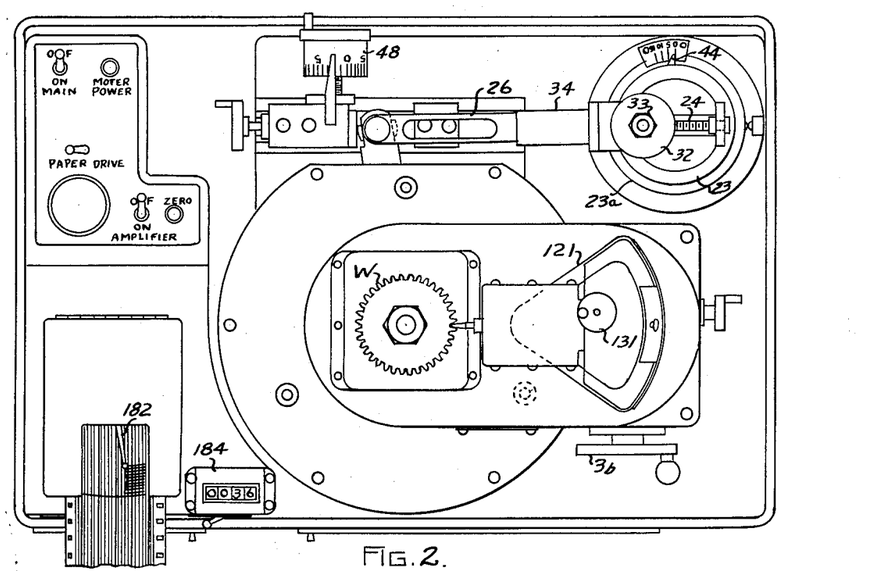
FIGURE 2 is a top plan view of the machine.

Cam ring 23a carries a marker 44 (FIGURE 2) which cooperates with the graduation markings on top of frame 6. These graduations as seen in FIGURE 2 represent 0° to 15°. The 0° reading represents a time when the crank pin 25 is on dead center and connecting rod 26 has reached its extreme left position. The spherical bearing 42 is then in contact with anvil 45 and the spring 37 is further compressed and snap ring 35a is moving away from washer 35.

The 15° graduation mark indicates the time when rod 26 is moved to the right and the spherical bearing member 42 is still contacting anvil 45 and the washer 35 is abutting against the shoulder 34b provided in housing 34.

When the crank pin 25 is rotated 180° to dead center the spherical bearing 42 is in contact with anvil 46 and spring 37 is further compressed until washer 35 is away from shoulder 34b of housing 34. When marker 44 is at the 10° mark this indicates a time when the air valves (to be described later) are operating to clamp the indexing disc 70 and work spindle 69 in place so the gear being inspected can be contacted by a stylus 136.

The connecting rod 26 is so constructed that restriction of the motion of the spherical bearing member 42 when it strikes either of the anvils 45 or 46 causes rod 26 to slide within connecting rod housing 34 and thus adjust itself to the throw of crank pin 25.

Work spindle 69 as illustrated herein is of the flanged type and is capable of adjustment in a plurality of directions. Spindle 69 accommodates a work arbor 71 on which the work W is mounted and held by means of nut 72.

Figures 5, 6, 7:
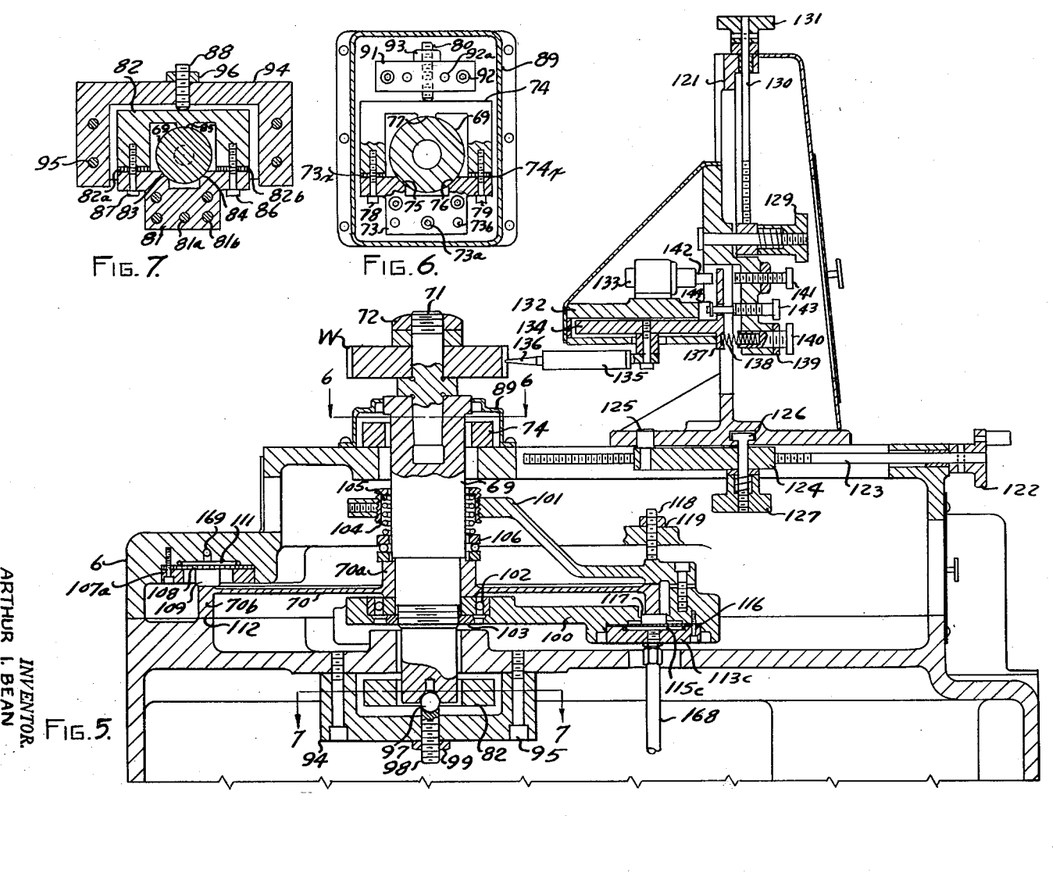
FIGURE 5 is a cut-away view taken along line 5—5 of FIGURE 4 showing the spindle and gear being checked and the upper and lower clamping mechanism which clamps the index disc.
FIGURE 6 is a view taken along line 6—6 of FIGURE 5 showing the aligning mechanism and bearing adjustment points on the upper spindle.
FIGURE 7 is a view taken along line 7—7 of FIGURE 5 showing the aligning mechanism and bearing adjustment points on the lower spindle.

Spindle 69 may be positioned at the top and bottom by proper location of the V block bearings shown in FIGURES 6 and 7.

The upper centering V block consists of two parts 73 and 74. This upper centering V block is positioned on top of Frame 6 and housed in oil seal cover 89. Block 73 is fastened to base 6 by bolts 73a and pins 73b and has two bearing points 75 and 76, and block 74 has one bearing point 77. These bearing points are in constant contact with spindle 69. Screw 80 is threaded in a member 91 which is held to base 6 by bolts 92 and pins 92a. After an adjustment set screw 80 is held securely in place by a nut 93. Two shims 73x and 74x are provided between blocks 73 and 74. These shims are of proper thickness to suit the spindle size.

The lower centering V block consists of two parts 81 and 82. Block 81 is fastened to base 6 by bolts 81a and pins 81b and has two bearing points 83 and 84 and block 82 has one bearing point 85. These bearing points are in constant contact with the lower portion of spindle 69. Set screw 88 is threaded in a frame member 94 which is held to base 6 by bolts 95 and after an adjustment to the lower part of spindle 69 set screw 88 is held securely in place by a nut 96. Two shims 82a and 82b are provided between blocks 81 and 82. These shims are of proper thickness to suit the spindle size.

The bottom of spindle 69 is supported by a ball 97 mounted in a socket at the center of the spindle. Ball 97 is held in place by a set screw 98 which is threaded through frame member 94 and held in place by nut 99. The purpose of this arrangement is so that spindle 69 may be raised or lowered to adjust the amount of contact pressure between the portion of base 6 designated by numeral 112 (FIGURE 5) and the rim 70b of index disc 70.

Index disc 70 is mounted on and fixed to rotate with the spindle 69 between the lower spider member 100 and upper spider member 101 which are fixed together. Lower spider 100 is mounted on a ball bearing 102 which surrounds a reduced portion of spindle 69.

Bearing 102 abuts against index plate hub 70a and is held in place by bearing nut 103.

Upper spider member 101 is mounted on spindle 69 by a threaded member which is a take-up bushing 104 and which contains a compression spring 105. Spring 105 abuts against a bearing 106 which rides on the hub 70a of index disc 70. Take-up bushing 104 may be tightened or loosened to govern the amount of pressure the upper spider pads of the clamping mechanism exert against the rim 70b of the index disc 70.

Mounted in the upper part of the base directly above the rim 70b of the index disc 70 are three clamps 107a, 107b and 107c. One of these clamps 107a may be seen in FIGURE 5.

The clamp 107a consists of a thin diaphragm 108 which has a pressure pad 109 centrally located thereon.

Diaphragm 108 is suitably sealed to make clamp 107a air tight. When air pressure is applied through line 169 to air chamber 111 it causes diaphragm 108 to deflect thus causing pressure pad 109 to move slightly and bear down on the rim 70b of index disc 70. By so doing rim 70b is pressed against member 112 of frame 6 and thereby clamps index disc 70. Clamps 107b and 107c function similarly.

Like clamps 113a, 113b and 113c are mounted in the lower spider 100. As shown in FIGURE 5, clamp 113c has a line 168 which admits air under pressure to chamber 115c to deflect diaphragm 116 and actuate pressure pad 117 to clamp rim 70b against the upper spider 101.

Index disc 70 consists of a hub 70a and rim 70b joined by a thin flexible web. This thin flexible web portion is capable of slight resilient flexibility when pressure is applied to outer rim 70b by any of the multiple clamps.

Three spider adjustment screws 118 are mounted in the base 6 and can be adjusted to bear on the top surface of the upper spider 101. Screws 118 may be locked in place by means such as a nut 119.

The previously mentioned spherical bearing member 42 is joined to an arm 120 (FIGURE 4) which is part of and extends radially of the lower spider 100. Arm 120 is connected to wrist pin 40 thereby making spider 100 oscillate upon reciprocation of connecting rod 26.

When the three bottom clamps 113a, 113b and 113c in lower spider 100 clamp index disc 70 to the spider and as the spherical bearing member 42 is oscillated a precisely controlled stroke length the lower spider and clamps are oscillated and thereby rotate index disc 70 and spindle 69 the desired amount until spherical bearing member 42 touches either one of the anvils. When the three lower clamps unlock (caused by the exhaust of the air supply to chambers 115c) the three upper clamps 107a, 107b and 107c are actuated to lock the index disc 70 and spindle 69 in a fixed position relative to base 6 while the stylus is inserted to contact one side of a tooth of the gear being measured. After measuring the stylus 136 is withdrawn a sufficient distance to permit the gear to be rotated. The upper clamps 107a, 107b and 107c are then unlocked and lower clamps 113a, 113b and 113c are locked and the spherical bearing member 42 is withdrawn away from one anvil and lower spider 100 rotates, and as the spherical member 42 strikes the opposite anvil the lower clamps are released from the index disc 70 for another gaging cycle.

The top of the base 6 is arranged for mounting a gage stand or indicator upright 121 (FIGURE 5).

Indicator upright 121 is keyed to the base and slides toward and away from the gear being checked, and may also be angularly adjustable. A hand wheel 122 is provided with an adjustment screw 123 for moving the gage stand 121 and the transducer 135 and stylus 136 into and away from a gear to be inspected during a set-up or changeover.

Screw 123 threads through a member 124 which is slideable in a way of base 6 and has upright indicator stand 121 attached to it by a pivot pin 125.

The head of T bolt 126 rides in a groove of upright 121 and has a lock nut handle 127 threaded to the other end for the purpose of tightening indicator upright 121 at any desired angular position.

Indicator stand 121 has a vertical slide 128 which may be adjusted vertically and held in any position by clamping screw 129. Vertical adjustment of slide 128 is effected by the rotation of screw 130 and hand wheel 131.

Attached to slide 128 is a horizontal gage slide 132. Gage slide 132 has mounted thereon an air cylinder 133 and a stylus slide 134.

Stylus slide 134 has mounted thereon a transducer 135 with a sensing means electrically linked to a recording system.

Transducer 135 has a suitably shaped stylus 136 for the particular gear being checked and any irregularity found in such a gear by stylus 136 will be transmitted through transducer 135 and recorded on a recording chart.

Air cylinder 133 when actuated abuts against member 137 and moves it backwards from left to right (FIGURE 5). Stylus slide 134 is integral with member 137. Member 137 is urged to the left as viewed in FIGURE 5 by spring 138 which is mounted in adjusting screw 140. A lock nut 139 is provided for locking adjusting screw 140. Screw 140 may be rotated to change the tension of spring 138 to alter the force exerted against member 137 and stylus slide 134.

An adjustable stop screw 141 is threaded into vertical slide 128 for the purpose of stopping the retraction of member 137 at any specific length of stroke caused by piston 142 of air cylinder 133.

This adjustment governs the length of return of transducer 135 and stylus 136, the latter needing only enough clearance to give the particular gear being measured room to rotate freely.

A second adjustment screw 143 is also threaded through vertical slide 128. Screw 143 has a retainer ring 144 mounted on its end. Screw 143 is for the purpose of holding slide 132 out in a retracted position when it is desirable to set up the work, the amount of this adjustment depending of course on the size of gear to be indexed.

Figure 11:
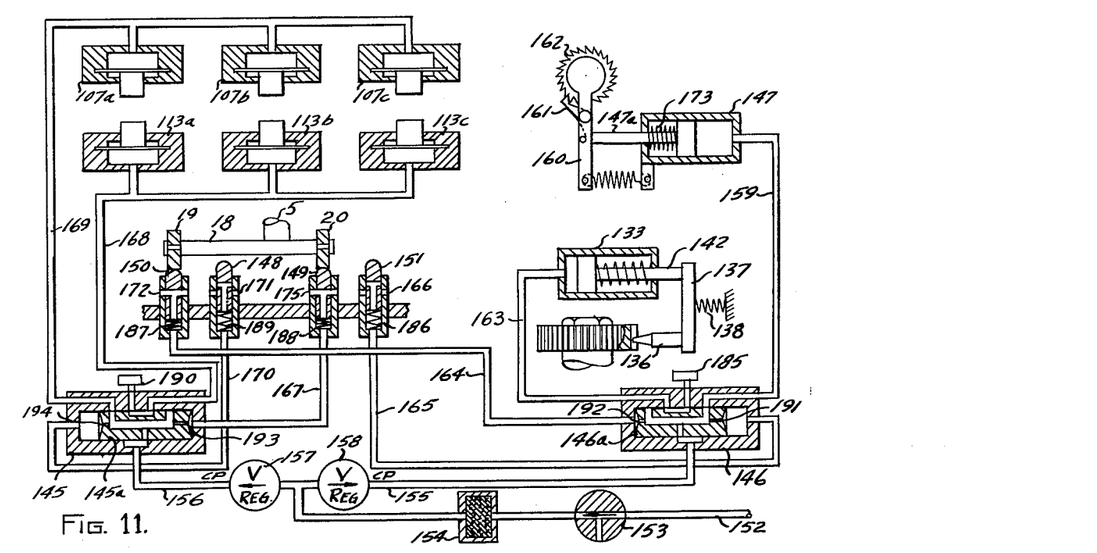
FIGURE 11 is a pneumatic system employed in the present invention illustrating the two separate sets of clamps and the actuating controls of said clamps. Shown also are the pneumatic controls for the measuring stylus and the recording chart.

Shown in FIGURE 11 is a pneumatic system which may be employed to operate the various elements of the mechanism herein concerned. Four-way valve 145 controls the pressure and exhaust to the two separate sets of clamps 107a, 107b and 107c and also clamps 113a, 113b and 113c. These clamps act on the rim 70b of the index disc 70.

The other four-way valve 146 controls the pressure and exhaust to air cylinder 133 and a second air cylinder 147 whose function is described below.

On the bottom of crank shaft 5 the valve actuator member 18 carries two valve actuators 19 and 20.

During the rotation of crank shaft 5 valve actuators 19 and 20 actuates a pair of limit valves which in turn control the functioning of the four-way valves 145 and 146.

For example, limit valves 148 and 149 are actuated by valve actuator 20 during its rotation to cause the actuation of four way valve 145. Limit valves 150 and 151 are actuated by valve actuator 19 during its rotation to cause the actuation of four way valve 146.

Air under pressure is introduced by any suitable means into line 152. A three way valve 153 must first be turned on manually then air passes through filter 154 in the direction of the arrows as shown in FIGURE 11. When the air enters lines 155 and 156 its pressure is stabilized as it passes through valve regulators 157 and 158 before entering the four way valves 145 and 146.

When air pressure is applied from four way valve 146 to either one of the air cylinders 133 or 147 the other one is always exhausting. As shown in FIGURE 11 air pressure from line 155 is passed through four way valve 146 to line 159 and activates air cylinder 147 to actuate lever 160 and pawl 161.

Figure 3:
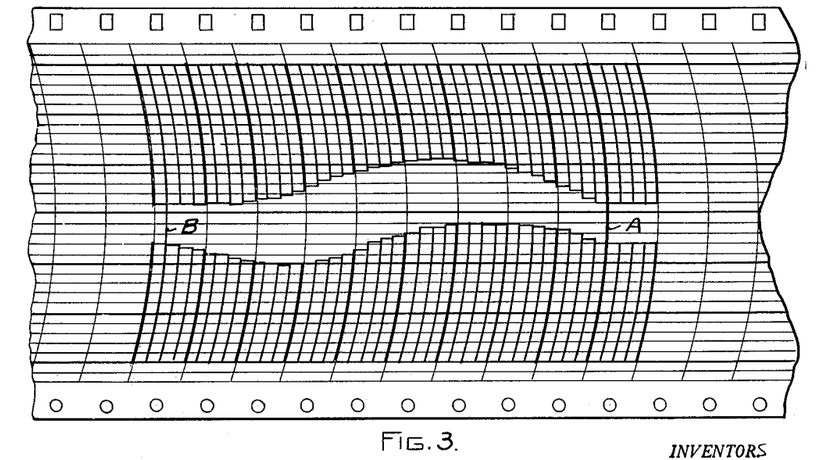
FIGURE 3 is a view showing a recording chart illustrating the complete indexing and measuring of a gear on both sides of the teeth.

Pawl 161 rotates a ratchet 162 which in a manner well known in the art advances the roll of a charting paper so that the recorder pen 182 (FIGURE 2) can trace the measurement of the gear tooth being inspected onto the roll of charting paper which has graduated lines running in parallel the length thereof as shown in FIGURES 2 and 3.

The measurement of the position of a gear tooth by means of the stylus 136 and the transfer of this position to the record chart is accomplished electrically through transducer 135 and will be described below.

When the recording of a particular tooth is taking place the stylus 136 and gage slide 132 under the urging of spring 138 are advanced and stylus 136 is in contact with the side of a tooth. Air cylinder 133 is in exhaust and air is flowing through line 163 and into spool 146a and out air vent 185. Spool 146a is held in the position as shown in FIGURE 11 because spring 186 is holding limit valve 151 in such a position that air cannot escape through port 166, therefore pressure from line 165 and pressure escaping from port 191 keep spoon 146a in the position as shown. At the same time limit valve 150 is being actuated by valve actuator 19 and line 164 is exhausting because spring 187 is depressed and air in line 164 along with air escaping from port 192 passes to atmosphere through port 172.

As this occurs stylus 136 is in to depth, tracing a tooth profile and electrically transmitting its findings to the chart. Valve actuator 20 is actuating limit valve 149 and line 167 is in exhaust because spring 188 is depressed and the air from line 167 and port 193 are passing to atmosphere through port 175. Air pressure is flowing from line 156 through four way valve 145 and into line 169 to actuate the three clamps 107a, 107b and 107c. Spool 145a is held in the position shown in FIGURE 11 because spring 189 is holding limit valve 148 in such a position that air cannot escape through port 171 therefore pressure in line 170 and pressure escaping from port 194 keep spool 145a in the position as shown in FIGURE 11. Clamps 107a, 107b and 107c hold the index wheel 70 in a locked position while stylus 136 is in contact with a particular tooth being measured. Clamps 113a, 113b and 113c are non-functioning and the line 168 which brings them under pressure is exhausting through spool 145a and out air vent 190. Also at this time connecting rod 26 is telescoping in connecting rod housing 34 to absorb any excess shock and to adjust itself to the throw of crank pin 25.

As crank shaft 5 rotates valve actuators 19 and 20 also rotate and strike limit valves 148 and 151, which also control the actuation of four way valves 145 and 146. For example the four way valve 146 is actuated by the release of limit valve 150 and the actuation of limit valve 151 which changes the flow of air pressure from line 159 to line 163. Valve 151 allows air to escape from line 165 and port 191 to atmosphere through port 166, while limit valve 150 is moved by spring 187 and air in line 164 with the added air that escapes from port 192 moves spool 146a in a position opposite from that shown in FIGURE 11. With the flow of air pressure now through lines 155 and 163 air cylinder 133 becomes activated and moves piston 142 against member 137. Member 137 moving to the right as seen in FIGURES 5 and 11 withdraws stylus slide 134 and stylus 136 from between the gear teeth which it has measured.

When this condition occurs air cylinder 147 becomes deactivated and excess pressure in line 159 escapes through air vent 185.

Spring 173 in cylinder 147 moves piston 147a and lever 160 and pawl 161 to the right as shown in FIGURE 11 in order to place pawl 161 in a new position with respect to ratchet 162 so that after the next actuation of four way valve 146 when air cylinder 147 becomes activated and air cylinder 133 becomes deactivated and spring 138 expands and stylus 136 goes in between the next two teeth, the ratchet 162 will be rotated to cause the paper recorder to roll so that a new tracing of the next tooth being inspected can be recorded.

When limit valve 151 is moved by valve actuator 19 and four way valve 146 causes air cylinder 133 to become activated and air cylinder 147 to become deactivated then stylus 136 moves out from between the gear teeth being inspected and valve actuator 20 strikes limit valve 148 to cause the gear being inspected to be indexed one tooth as described below.

When limit valve 148 is actuated spool 145a in four way valve 145 moves and changes the flow of air pressure from line 156 to line 168 instead of to line 169 because air in line 170 and air from port 194 escapes to atmosphere through port 171 and spring 188 in limit valve 149 releases to block port 175 so pressure is maintained in line 167 and air escaping from port 193 causes spool 145a to move to a position opposite from that shown in FIGURE 11. At this time air pressure in line 169 escapes through air vent 190.

The loss of pressure in line 169 causes the three clamps 107a, 107b and 107c to release index disc 70 and then the pressure in line 168 causes the three clamps 113a, 113b and 113c to clamp the underside of index disc rim 70b to the upper spider 101 and the lower spider 100. The lower spider 100 is then oscillated by the crank pin 25 and crank shaft 26 and spherical bearing member 42 which is held by wrist pin 40 to lower spider 100 and which is oscillated until spherical bearing member 42 abuts against anvil 46. This oscillation is the amount necessary for the rotation of spindle 69 to index the gear the necessary distance to bring another tooth in line to be inspected by stylus 136.

It can readily be seen that the distance between anvils 45 and 46 is of primary importance in determining the amount of rotary index to be obtained. The distance between the anvils can be accurately adjusted to obtain the exact amount of indexing desired.

When spherical bearing member 42 abuts against anvil 46 the necessary rotation of crank shaft 5 has occurred to cause the valve actuators 19 and 20 to have rotated enough to strike the limit valves 150 and 149 to cause the same sequence previously described to occur again whereby clamps 113a, 113b and 113c declamp to stop indexing and clamps 107a, 107b and 107c clamp to hold the index disc 70 secured to the frame 6 while at the same time spindle 69 is held stopped with its gear presenting new teeth in position to be inspected and air cylinder 133 becomes deactivated and stylus 136 moves in between the new teeth to check same while air cylinder 147 becomes activated to cause pawl 161 to rotate ratchet 162 and roll the recording chart enough so a new marking can be made of the new tooth being inspected.

Figure 12:
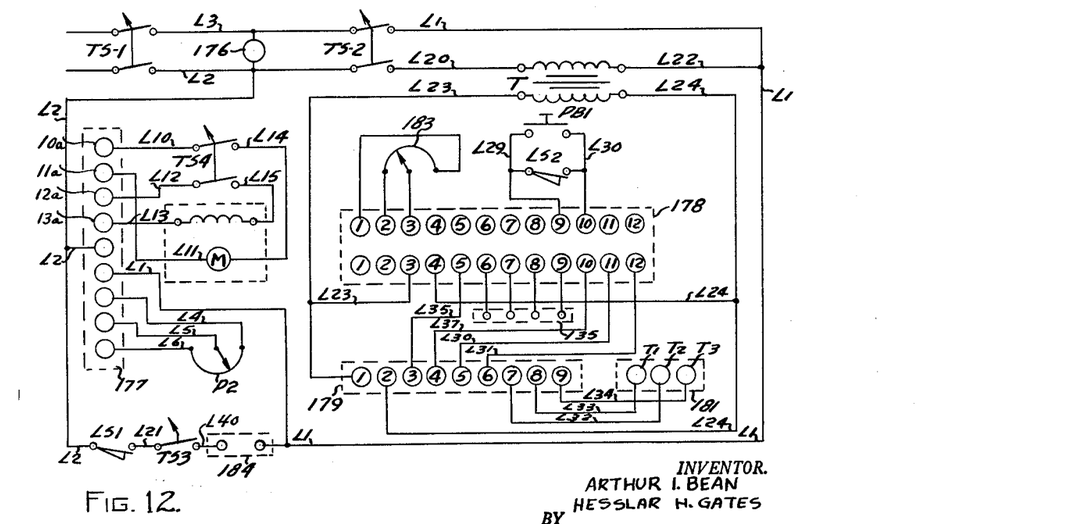
FIGURE 12 is a typical electrical system employed to count, amplify, and record inspection findings of the present invention.
Figure 13:
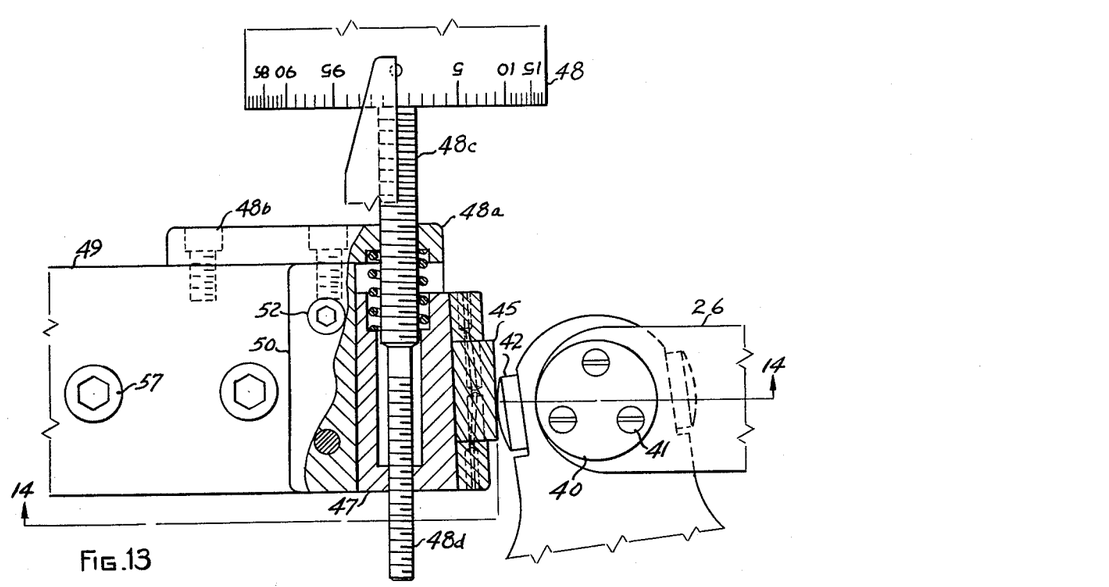
FIGURE 13 is an enlarged top plan view, partly in section showing the differential screw assembly for effecting fine adjustment of one anvil with the spherical bearing member in contact therewith.
Figure 14:
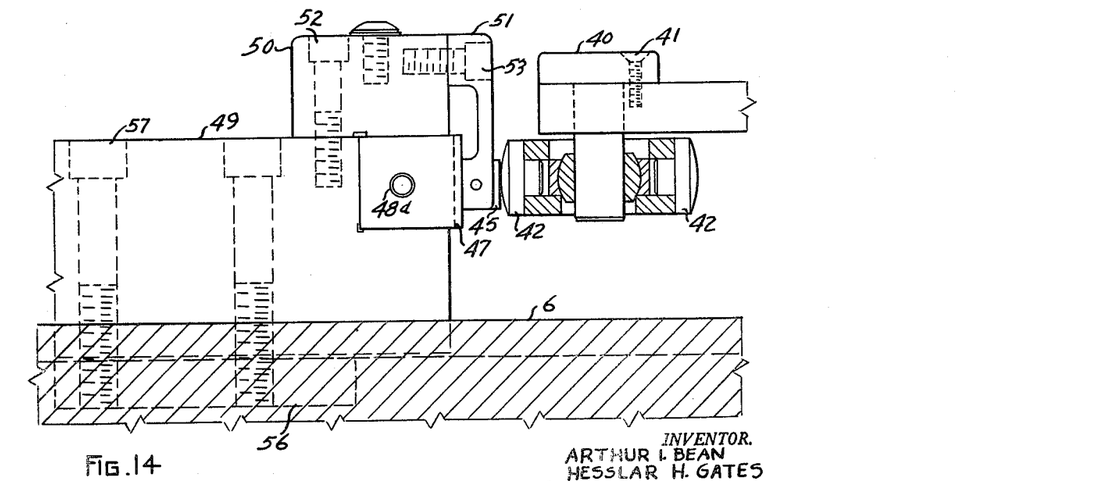
FIGURE 14 is a view taken along line 14—14 of FIGURE 13 showing the cross-section of the spherical bearing member.

Shown in FIGURE 12 is a typical electrical hook-up which can be employed by one skilled in the art to secure the desired results. The toggle switch TS–1 is for the purpose of turning power on and energizing lines L2 and L3. With this connection an indicator lamp 176 lights to signal the operator that the power is on. TS–2 is a toggle switch for turning the power on to connect line L1 and L20 to supply power to the constant voltage transformer (t) which has an unfluctuating secondary voltage to supply the power input to lines L23 and L24. Power continues down these two lines to terminals 3 and 4 to actuate a basic amplifier 178. At this time power travels down lines L23 and L24 to terminals 1 and 2 to actuate the D.C.

amplifier 179. Lines L1 and L2 now supply voltage input to speed control unit 177 where the alternating current is transformed and rectified to direct current, then fed out to the D.C. motor M from terminals 10a, 11a, 12a and 13a by way of lines L10, L11, L12 and L13 through lines L14 and L15 when the "off" and "on" toggle switch TS4 is in an "on" position. A speed potentiometer P2 which is fed power from the speed control unit 177 by means of lines L4, L5 and L6 determines the desired amount of revolutions per minute which the motor M will run. By turning P2 clockwise motor M will speed up.

The measuring transducer or sensing head and designated by the number 135, is a commercial probe head of standard quality as is also the basic amplifier 178 and the recorder 181. These units applied as they are herein along with other elements of the present invention make a combination in which many varied alternate modes of index recording may be applied. But it is to be understood that a departure from the teachings as shown herein by the application of alternate parts and modes of operation is not to be construed as a departure from the generic scope of the present invention.

When the probe 136 abuts against the contour of a tooth the sensing head 135 sends its signal to the basic amplifier 178 by terminals 6, 7, 8 and 9. The signal is amplified and sent out terminal 5 through line L35, and terminal 10 through line L30, and terminal 12 through line L31 to the D.C. amplifier's terminals 3, 4, 5 and 6 where it is amplified and sent out terminal 7 through line L32, and terminal 8 through line L33, and terminal 9 through line L34 to the terminals "T1," "T2," and "T3" of recorder 181.

Recorder 181 includes a pen 182 shown in FIGURE 2 which is effected by the signal received from the D.C. amplifier 179.

A tuning potentiometer 183 is provided on the basic amplifier 178 and connected therewith by terminals 1, 2 and 3. The pen may be adjusted to the center position when the machine is being set up.

Connected to the terminals 9 and 10 of the basic amplifier are two lines L29 and L30, in between these two lines is a contact LS2 of the counter 184 and a push button PB1.

With either contact LS2 or push button PB1 closed a signal from the sensing head 135 is allowed to pass and become recorded.

When both contact LS2 and push button PB1 are open no signal may pass to become recorded. The contact LS2 of the counter 184 is closed until the gear being checked has been rotated one complete revolution and the counter 184 has counted itself out, then the contact LS2 opens and lines L29 and L30 are opened to stop the signal from the sensing head to the recorder.

The push button PB1 is depressed to contact lines L29 and L30 when it is desirable to have the recorder pen 182 make a mark across the entire width of the recording chart to indicate a starting point for a new gear being inspected.

Each revolution of the crank shaft 5 causes crank head 23 to bring button 43 around to actuate limit switch LS1 to connect lines L2 and L21 providing the toggle switch TS3 is in an "on" position then lines L21 and L40 are connected and counter 184 is energized.

Each actuation of limit switch LS1 makes contact to energize counter 184 and it begins counting out a prescribed number. When the prescribed number is reached the contact LS2 opens and the signal from the sensing head stops being sent to the recorder.

The series of marks on the recording chart in FIGURE 3 represent a series of measurements taken on both sides of the teeth of a gear consisting of 35 teeth. The readings consist of an event mark "A," then additional readings beginning with the first tooth of the gear, and continuing through additional readings on each successive tooth through the thirty-five teeth; then another event mark "B" and a second reading of the first tooth.

The index arrangement of the instrument is adjusted so that the second indication of the first tooth has the same value as the first indication of this tooth. This assures that the instrument spindle has turned 360° in 35 equal indexes.

The variation in heights of the recordings for any two teeth is a measurement of the index error between these teeth. The maximum index error in the gear is measured by the maximum variation between the recordings for any two teeth. The variation between the recordings for any two adjacent teeth is a measurement of the pitch error between these two teeth.

The recording for one side of the gear teeth is made complete, and then the recording for the other side of the gear teeth is made. They may be made side by side as shown or spaced apart longitudinally on the chart.

What we claim and desire to secure by Letters Patent is:

1. In a gear testing machine of the character described, a base, a work holding spindle rotatably mounted in said base, an indicator stylus mounted on said base adjacent to said spindle in such a position as to be adapted to engage the teeth of a work gear mounted on said work holding spindle, means to intermittently rotate said work holding spindle, said last named means including an index plate fixed to rotate with said spindle having a rim and a flexible web joining said rim to said spindle, means to clamp said rim to said rotating means and means actuated in timed relation to said clamping means to hold said rim against rotation relative to said base upon release of said clamping means whereby said stylus may be brought into engagement with a tooth on said work gear while said spindle is stationary, said flexible web providing a cushioning effect for the starting and stopping of rotation of said work spindle.

2. In a gear testing machine of the character described, a base, a work holding spindle rotatably mounted in said base, an indicator stylus mounted on said base adjacent to said spindle in such a position as to be adapted to engage the teeth of a work gear mounted on said work holding spindle, means to intermittently rotate said work holding spindle, said last named means including a driving motor, a crank adjustably connected to and driven by said motor, a member mounted on said spindle and adapted to be clamped thereto, means to clamp said member to said spindle, and a connecting rod joining said crank to said member, whereby said work spindle is urged to rotate when said member is clamped to said spindle, adjustable stop means carried by said base, and a bearing member fixed to said connecting rod adapted to be limited in its motion by said stop means, said connecting rod being resiliently coupled to said crank so that said crank may have continued movement in a given direction while said connecting rod is held against movement by the engagement of said bearing member with said stop means.

3. A device of the character described in claim 2 in which there is a means actuated in timed relation to said clamping means to hold said spindle against rotation relative to said base and said stylus upon release of said clamping means whereby said stylus may be brought into engagement with a tooth on said work gear while said spindle is stationary.

4. In a gear testing machine of the character described, a base, a work holding spindle rotatably mounted in said base, an indicator stylus mounted on said base adjacent to said spindle in such a position as to be adapted to engage the teeth of a work gear mounted on said work holding spindle, means to intermittently rotate said work holding spindle, said last named means including a driving motor, a crank adjustably connected to and driven by said motor, a member mounted on said spindle and adapted to be clamped thereto, means to clamp said member to said spindle, and a connecting rod joining said crank to said member whereby said work spindle is urged to rotate when said member is clamped to said spindle, a pair of stops fixed to said base, means to adjust said stops towards and away from each other, a bearing member fixed to said connecting rod and interposed between said stops, said bearing member being disposed to bear against either of said stops to limit movement of one end of said connecting rod, and said connecting rod being resiliently coupled to said crank so that said crank can have continued movement while said connecting rod is held against movement in a given direction due to engagement of said bearing member with one of said stops.

5. A device of the character described in claim 4 in which there is a means actuated in timed relation to said clamping means to hold said spindle against rotation relative to said base and said stylus upon release of said clamping means whereby said stylus may be brought into engagement with a tooth on said work gear while said spindle is stationary.

References Cited by the Examiner

UNITED STATES PATENTS

| 2,023,579 | 12/35 | Dodge | 74—582 X |
| 3,034,219 | 5/62 | Bregi | 33—179.5 |

ISAAC LISANN, *Primary Examiner.*

LEONARD FORMAN, *Examiner.*